(12) United States Patent
Park

(10) Patent No.: US 9,565,146 B2
(45) Date of Patent: Feb. 7, 2017

(54) APPARATUS AND METHOD FOR CONTROLLING MESSENGER IN TERMINAL

(71) Applicant: Samsung Electronics Co., Ltd., Suwon-si, Gyeonggi-do (KR)

(72) Inventor: Hyung-Jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 14/176,443

(22) Filed: Feb. 10, 2014

(65) Prior Publication Data

US 2014/0237394 A1 Aug. 21, 2014

(30) Foreign Application Priority Data

Feb. 20, 2013 (KR) ........................ 10-2013-0018284

(51) Int. Cl.
*G06F 3/00* (2006.01)
*H04L 12/58* (2006.01)
*G06F 3/0481* (2013.01)
*H04L 12/18* (2006.01)

(52) U.S. Cl.
CPC ............. *H04L 51/06* (2013.01); *G06F 3/0481* (2013.01); *H04L 12/1822* (2013.01); *H04L 51/16* (2013.01)

(58) Field of Classification Search
CPC ........ H04L 51/06; H04L 51/16; H04L 12/581; H04L 12/1813; H04L 12/1822; G06F 3/0481
See application file for complete search history.

(56) References Cited

U.S. PATENT DOCUMENTS

| 5,764,899 A * | 6/1998 | Eggleston ........... H04L 12/5855 709/203 |
| 7,062,536 B2 * | 6/2006 | Fellenstein .......... G06Q 10/107 709/206 |
| 2003/0197730 A1 * | 10/2003 | Kakuta ............... H04L 12/1827 715/758 |
| 2007/0106948 A1 * | 5/2007 | Ala-Rantala ......... G06Q 10/107 715/752 |

(Continued)

FOREIGN PATENT DOCUMENTS

| KR | 10-2010-0063838 A | 6/2010 |
| KR | 10-2012-0030266 A | 3/2012 |

(Continued)

*Primary Examiner* — Kieu Vu
*Assistant Examiner* — Asteway T Gattew
(74) *Attorney, Agent, or Firm* — Jefferson IP Law, LLP

(57) ABSTRACT

An apparatus for controlling a messenger in a terminal is provided. A display displays an answer phrase to a specific chat phrase among a plurality of chat phrases in a messenger chat window. Upon receiving an answer phrase to a specific chat phrase which is not displayed in a display area of the messenger chat window, a controller notifies of the reception of the answer phrase, and if 'View Answer Phrase' is selected, the controller moves to a position area where the specific chat phrase is displayed, and displays the specific chat phrase and the answer phrase. The controller manages the plurality of chat phrases using index information indicating a position for each of the plurality of chat phrases. If an answer phrase to the specific chat phrase is sent, the controller generates index information of the answer phrase associated to the index information of the specific chat phrase.

34 Claims, 15 Drawing Sheets

(56) References Cited

U.S. PATENT DOCUMENTS

| | | | |
|---|---|---|---|
| 2007/0142099 A1* | 6/2007 | Seo | H04M 1/72583 455/575.3 |
| 2007/0180040 A1* | 8/2007 | Etgen | G06Q 10/107 709/207 |
| 2007/0186172 A1 | 8/2007 | Sego et al. | |
| 2007/0203985 A1* | 8/2007 | Abernethy, Jr. | G06Q 10/107 709/206 |
| 2008/0263157 A1* | 10/2008 | Bhogal | G06Q 10/107 709/206 |
| 2009/0070294 A1 | 3/2009 | Chijiiwa | |
| 2009/0119371 A1* | 5/2009 | Chang | H04L 12/1827 709/206 |
| 2009/0282347 A1* | 11/2009 | Abernethy | G06Q 10/107 715/753 |
| 2010/0185960 A1 | 7/2010 | Christie et al. | |
| 2012/0072856 A1 | 3/2012 | Park et al. | |
| 2013/0018909 A1 | 1/2013 | Dicker et al. | |

FOREIGN PATENT DOCUMENTS

| | | |
|---|---|---|
| KR | 10-2013-0007348 A | 1/2013 |
| WO | 2005/104433 A1 | 11/2005 |

\* cited by examiner

APPARATUS AND METHOD FOR CONTROLLING MESSENGER IN TERMINAL

PRIORITY

This application claims the benefit under 35 U.S.C. §119(a) of a Korean patent application filed on Feb. 20, 2013 in the Korean Intellectual Property Office and assigned Serial No. 10-2013-0018284, the entire disclosure of which is incorporated herein by reference.

BACKGROUND OF THE INVENTION

1. Field of the Invention

The present invention relates generally to an apparatus and method for controlling a messenger in a terminal. More particularly, the present invention relates to a messenger control apparatus and method for allowing a user to selectively answer a specific chat phrase among a plurality of chat phrases in a messenger chat window in a terminal.

2. Description of the Related Art

Thanks to the combination of mobile telecommunications services and Internet services, users may wirelessly access the Internet on their terminal even while on the move, search a wide variety of Internet information and E-mails, and enjoy a variety of multimedia content such as music and videos. Based on these technical advances, the instant messenger services, which have been used in the wired Internet, are now available even via wireless Internet when using user terminals.

When messenger chat is carried out on a terminal in real time, the chat phrases through the messenger are displayed in a messenger chat window in chronological order.

However, in the case where the chat phrases through the messenger are displayed in chronological order, if a user of a terminal receives multiple questions from a counterpart terminal in a row and gives an answer to any one of the received questions, a user of the counterpart terminal may have difficulty in determining to which question the user of the terminal entered (or gave) the answer.

FIG. 1 illustrates a messenger operation performed in a second terminal B according to the related art.

Referring to FIG. 1, chat phrases received from a first terminal A, which is a counterpart terminal, are displayed in the left side of the messenger chat window, while chat phrases entered in the second terminal B are displayed in the right side thereof.

If a user of the second terminal B enters one chat phrase after receiving four chat phrases from the first terminal A in a row as illustrated in FIG. 1, a user of the first terminal A may have difficulty in determining to which of the four chat phrases the chat phrase entered in the second terminal B is matched.

Therefore, the user of the second terminal B needs to annoyingly specify one of the fourth chat phrases when answering the chat phrase.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a messenger control apparatus and method for allowing a user to selectively answer a specific chat phrase among a plurality of chat phrases in a messenger chat window in a terminal.

Another aspect of the present invention is to provide a messenger control apparatus and method for, upon receiving an answer phrase to a specific chat phrase which is not displayed in the current area of a messenger chat window of a terminal, moving to a position where the specific chat phrase and the answer phrase are displayed, thereby allowing the user to view or read the displayed phrases.

Another aspect of the present invention is to provide a messenger control apparatus and method for, upon receiving an answer phrase to a specific chat phrase which is deleted from a messenger chat window of a terminal, displaying the deleted specific chat phrase and the answer phrase, and notifying of the deletion of the specific chat phrase at a counterpart terminal.

In accordance with an aspect of the present invention, an apparatus for controlling a messenger in a terminal is provided. The apparatus includes a display configured to display an answer phrase to a specific chat phrase among a plurality of chat phrases in a messenger chat window, and a controller configured to, upon receiving an answer phrase to a specific chat phrase which is not displayed in a display area of the messenger chat window, notify of the reception of the answer phrase, and if 'View Answer Phrase' is selected, move to a position area where the specific chat phrase is displayed, and display the specific chat phrase and the answer phrase. The controller is further configured to manage the plurality of chat phrases using index information indicating a position for each of the plurality of chat phrases, if an answer phrase to the specific chat phrase is sent, generate index information of the answer phrase associated to the index information of the specific chat phrase, and if 'View Answer Phrase' is selected after the answer phrase is received, detect a position area where the specific chat phrase is displayed, based on the index information of the specific chat phrase, move to the detected position area, and display the specific chat phrase and the answer phrase.

In accordance with another aspect of the present invention, an apparatus for controlling a messenger in a terminal is provided. The apparatus includes a display configured to display a deleted specific chat phrase among a plurality of chat phrases in a messenger chat window, and an answer phrase to the deleted specific chat phrase, and a controller configured to detect the deleted specific chat phrase from received messenger information including the answer phrase and display the detected specific chat phrase and the answer phrase in the messenger chat window, if the specific chat phrase associated with the answer phrase among the plurality of chat phrases in the messenger chat window is deleted when the answer phrase to the specific chat phrase in the messenger chat window is received.

In accordance with further aspect of the present invention, a method for controlling a messenger in a terminal is provided. The method includes upon receiving an answer phrase to a specific chat phrase which is not displayed in a display area of a messenger chat window, notifying of the reception of the answer phrase, if 'View Answer Phrase' is selected, moving to a position area where the specific chat phrase is displayed, and displaying the specific chat phrase and the answer phrase, managing the plurality of chat phrases using index information indicating a position for each of the plurality of chat phrases, if an answer phrase to the specific chat phrase is sent, generating index information of the answer phrase associated to the index information of the specific chat phrase, and if 'View Answer Phrase' is selected after the answer phrase is received, detecting a position area where the specific chat phrase is displayed, based on the index information of the specific chat phrase, moving to the detected position area, and displaying the specific chat phrase and the answer phrase.

In accordance with another aspect of the present invention, a method for controlling a messenger in a terminal is provided. The method includes detecting a deleted specific chat phrase from received messenger information including an answer phrase, if the specific chat phrase associated with the answer phrase among the plurality of chat phrases in the messenger chat window is deleted when the answer phrase to the specific chat phrase in the messenger chat window is received, and displaying the detected specific chat phrase and the answer phrase in the messenger chat window.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal, to which exemplary embodiments of the present invention are applicable, may include a mobile terminal and a fixed terminal. The mobile terminal is an easy-to-carry mobile electronic device, and may include a video phone, a cellular phone, a smart phone, a Wideband Code Division Multiple Access (CDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book reader, a portable computer (for example, a laptop computer, a tablet computer and the like), a digital camera and the like. The fixed terminal may include a desktop Personal Computer (PC) and the like.

Figure 1:
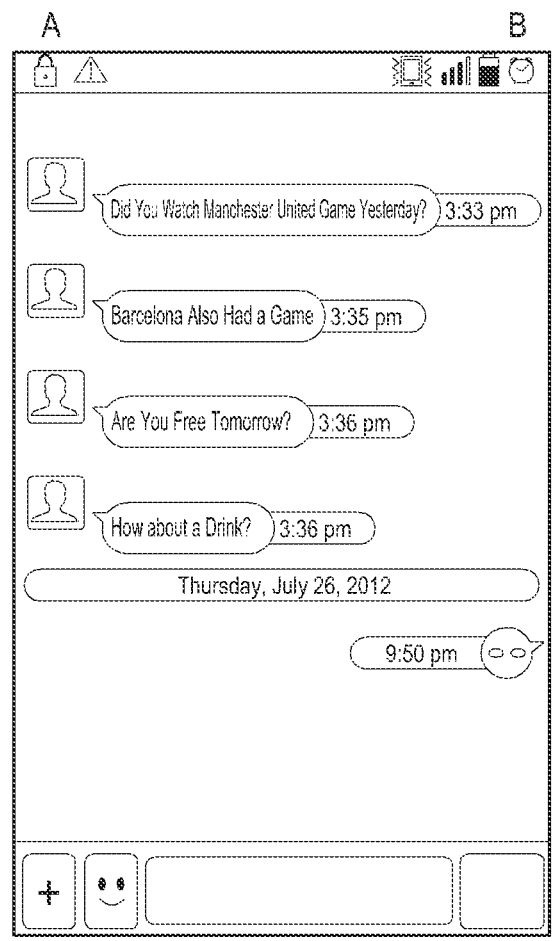
FIG. 1 illustrates a messenger operation performed according to the related art.
Figure 2:
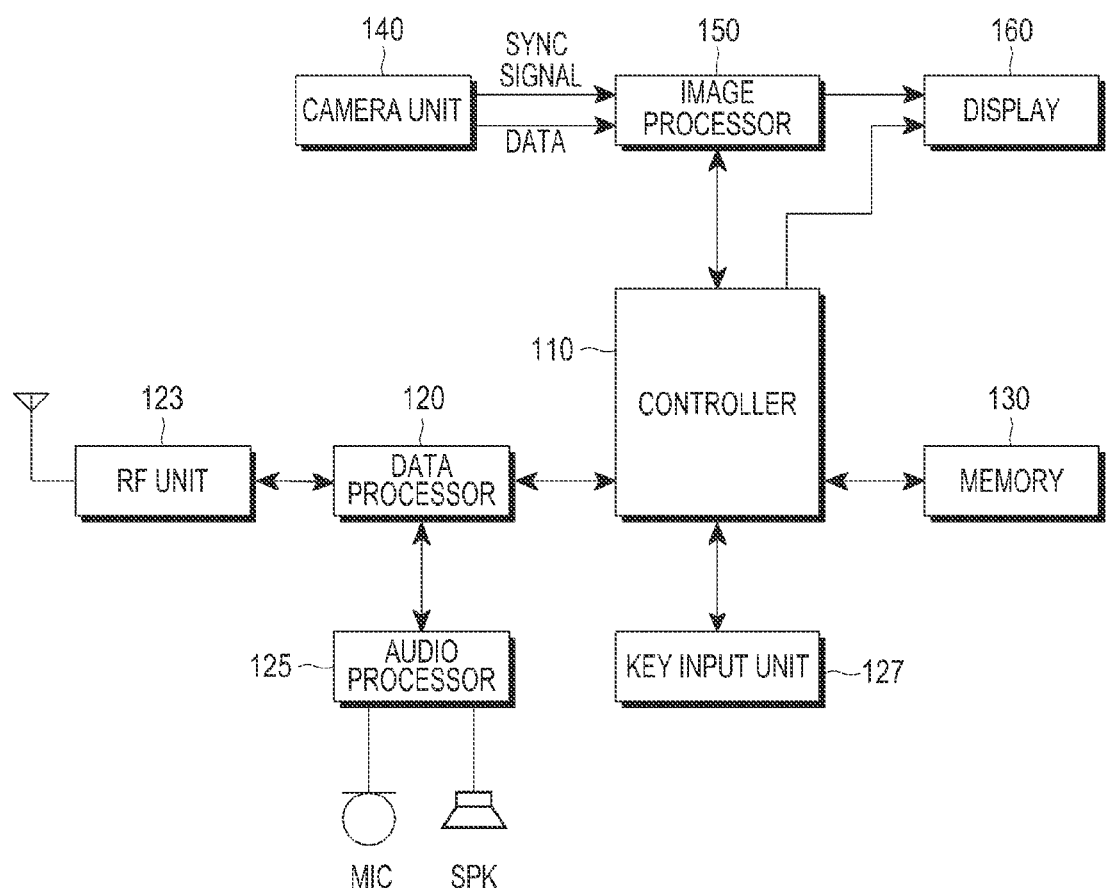
FIG. 2 illustrates a structure of a terminal according to an exemplary embodiment of the present invention.

FIG. 2 illustrates a structure of a terminal according to an exemplary embodiment of the present invention.

Referring to FIG. 2, a Radio Frequency (RF) unit 123 is responsible for wireless communication of the terminal. The RF unit 123 includes an RF transmitter for up-converting a frequency of transmission signals and amplifying the up-converted transmission signals, and an RF receiver for low-noise-amplifying received signals and down-converting a frequency of the low-noise-amplified received signals. A data processor 120 includes a transmitter for coding and modulating the transmission signals, and a receiver for demodulating and decoding the received signals. In other words, the data processor 120 may be comprised of a modulator/demodulator (modem) and a coder/decoder (codec). The codec includes a data codec for processing packet data and the like, and an audio codec for processing audio signals such as voice. An audio processor 125 plays received audio signals output from the audio codec in the data processor 120, using a speaker SPK, and transfers transmission audio signals picked up by a microphone MIC to the audio codec in the data processor 120.

A key input unit 127 includes character/numeric keys for entering character/numeric information, and function keys for setting various functions.

A memory 130 may be comprised of a program memory and a data memory. The program memory may store control programs for, upon receiving an answer phrase to a specific chat phrase which is not displayed in a display area of a messenger chat window, moving to the position where the specific chat phrase and its answer phrase are displayed, thereby allowing the user to view or read the displayed phrases. The program memory may store control programs for, upon receiving an answer phrase to a specific chat phrase which is deleted from a messenger chat window, displaying the deleted specific chat phrase and its answer phrase, and notifying of the deletion of the specific chat phrase at a counterpart terminal. The data memory temporarily stores the data generated during execution of the programs.

A controller 110 controls the overall operation of the terminal.

In accordance with an exemplary embodiments of the present invention, upon receiving an answer phrase to a specific chat phrase which is not displayed in a display area of a messenger chat window, the controller 110 notifies of the reception of the answer phrase, and if 'View Answer Phrase' is selected, the controller 110 moves to the position of the specific chat phrase and displays the specific chat phrase and the answer phrase in the display area of the messenger chat window.

Due to the limited size of a display 160, the messenger chat window may be divided into a display area where chat phrases being present are displayed, and a non-display area where chat phrases being present are not displayed. Therefore, if 'View Answer Phrase' is selected while the specific chat phrase associated with the answer phrase exists in the non-display area, the controller 110 may move to the position area where the specific chat phrase is displayed, in the non-display area, and displays the specific chat phrase and the answer phrase. The answer phrase may be displayed in a position near (for example, upper, lower, left or right side of) the specific chat phrase.

It will be assumed herein that the answer phrase is displayed in the lower side of the specific chat phrase.

The controller 110 may manage the plurality of chat phrases in the messenger chat window, using index information thereof.

The index information refers to information indicating a position for each of the plurality of chat phrases, and may include information about the time at which a chat phrase or an answer phrase is sent and received, and/or a specific value that is granted depending on the order of the time at which each of the plurality of chat phrases is sent and received.

In the case where the information about the time, at which a chat phrase or an answer phrase is sent and received, is used as the index information, index information of a chat phrase represents 'time at which the chat phrase is sent and received', and index information of an answer phrase represents '(time at which a specific chat phrase associated with the answer phrase is sent and received)+(time at which the answer phrase is sent and received)'.

For example, after a first chat phrase is written in a terminal, the first chat phrase may be displayed in a messenger chat window of the terminal and sent to a counterpart terminal executing a messenger, if a Send button is entered. At this point, the time (for example, 09:00:00), at which the first chat phrase is sent, may be generated as index information of the first chat phrase.

If a second chat phrase is received at the terminal from the counterpart terminal, the time (for example, 10:00:01), at which the second chat phrase is received, may be generated as index information of the second chat phrase.

If a first answer phrase to the first chat phrase is received at the terminal from the counterpart terminal, 'index information (for example, 09:00:00) of the first chat phrase and the time (for example, 09:30:02) at which the first answer phrase is received' may be generated as index information of the first answer phrase.

If a second answer phrase to the second chat phrase is written in the terminal and sent to the counterpart terminal as a Send button is entered, 'index information (for example, 10:00:00) of the second chat phrase and the time (for example, 10:30:002) at which the second answer phrase is sent' may be generated as index information of the second answer phrase.

In other words, index information of a chat phrase represents 'time at which the chat phrase is sent and received', and index information of an answer phrase represents '(time at which a specific chat phrase associated with the answer phrase is sent and received)+(time at which the answer phrase is sent and received)'.

If a first answer phrase to an answer phrase is sent and received, index information of the first answer phrase to an answer phrase represents '(time at which a specific chat phrase associated with the answer phrase is sent and received)+(time at which the answer phrase is sent and received)+(time at which the first answer phrase is sent and received)'.

In the case where a specific value that is granted depending on the order of the time at which each of the plurality of chat phrases is sent and received, is used as index information, a specific value (for example, a number) may be granted to each of a plurality of chat phrases, which are displayed in a messenger chat window in an order of the time at which they are sent and received.

For example, if 10 chat phrases are displayed in a terminal after a Send button is entered, a specific value of 1 to 10 is sequentially granted to each of the chat phrases in an order of being sent. In addition, if 9 chat phrases received from a counterpart terminal are displayed in the other side of the messenger chat window, a specific value of 1 to 9 is sequentially granted to each of the chat phrases in an order of being received.

If an answer phrase to a third chat phrase, to which index information of '3' is granted, among 10 chat phrases of the terminal is received at the terminal from the counterpart terminal, index information of '3-1' is granted to the answer phrase. In addition, if a first answer phrase to the answer phrase having the index information of '3-1' is received, the index information of '3-1-1' is granted to the first answer phrase.

Similarly, if a Send button is entered in the terminal after an answer phrase to a second chat phrase, to which index information of '2' is granted, among 9 chat phrases of the counterpart terminal is written, index information of '2-1' is granted to the answer phrase. In addition, if a first answer phrase to the answer phrase having the index information of '2-1' is sent, index information of '2-1-1' is granted to the first answer phrase.

It will be assumed herein that a specific value that is granted depending on the order of the time at which each of the plurality of chat phrases is sent and received, is used as index information.

Therefore, if 'View Answer Phrase' is selected after an answer phrase to a specific chat phrase is received, the controller 110 detects the position area where the specific chat phrase is displayed, based on the index information of the specific chat phrase, moves to the detected position area, and displays the specific chat phrase and the answer phrase.

Upon receiving the answer phrase, the controller 110 notifies of the reception of the answer phrase, displays the number of received answer phrases, and decreases the number of displayed received answer phrases each time 'View Answer Phrase' is selected. Notifying of the reception of the answer phrase may include displaying an icon and/or generating vibrations.

It will be assumed herein that the controller 110 displays an icon to notify the reception of an answer phrase. Therefore, the controller 110 may decrease the number of displayed received answer phrases each time the icon is selected.

If 'View Answer Phrase' is selected, the controller 110 may display a pop-up window including a specific chat phrase and its answer phrase which is displayed in the lower side of the specific chat phrase.

If 'View Answer Phrase' is selected, the controller 110 may capture a specific chat phrase, an answer phrase to the specific chat phrase, and preceding and subsequent chat phrases of the specific chat phrase in an image in a messenger chat window, and display the captured image as a pop-up window.

If 'Display Messenger Chat Window' is selected while displaying in a pop-up window a specific chat phrase and its answer phrase which is displayed in the lower side of the specific chat phrase, the controller 110 may move to the position where the specific chat phrase is located in the messenger chat window, and display the specific chat phrase and the answer phrase.

If 'Next Answer' is selected while displaying in a pop-up window a specific chat phrase and its answer phrase which is displayed in the lower side of the specific chat phrase, the controller 110 may display in the pop-up window a specific chat phrase and its answer phrase, which are received next.

Upon receiving messenger information including a specific chat phrase, index information of the specific chat phrase in a messenger chat window and its answer phrase, the controller 110 may detect the position area where the specific chat phrase among a plurality of chat phrases in the messenger chat window is displayed, based on the index information of the specific chat phrase, and display the answer phrase in the lower side of the detected position area of the specific chat phrase.

If an answer phrase to a specific chat phrase among a plurality of chat phrases in a messenger chat window is entered, the controller 110 may display the entered answer phrase in the lower side of the specific chat phrase. At the same time, the controller 110 may transmit, to the counterpart terminal, messenger information including the specific chat phrase, index information of the specific chat phrase, the answer phrase to the specific chat phrase, and a phone number of the counterpart terminal.

If an answer phrase to a specific chat phrase in a messenger chat window is received, but the specific chat phrase associated with the answer phrase, among a plurality of chat phrases in the messenger chat window, is deleted, the controller 110 may detect the deleted specific chat phrase based on the messenger information received from the counterpart terminal including the answer phrase, and display the detected specific chat phrase and the answer phrase in the messenger chat window. The messenger information includes a specific chat phrase, index information of the specific chat phrase, and an answer phrase to the specific chat phrase.

The controller 110 displays the detected specific chat phrase and the answer phrase in the last position of the messenger chat window.

When displaying the detected specific chat phrase and the answer phrase in the messenger chat window, the controller 110 may display the detected specific chat phrase to be distinguishable from other chat phrases so as to indicate that the detected specific chat phrase is a deleted phrase.

The controller 110 may transmit, to the counterpart terminal, an acknowledgement signal including a specific value indicating that the specific chat phrase is deleted. Upon receiving a related image for the deleted specific chat phrase from the counterpart terminal, the controller 110 may display, as a pop-up window, the image including the deleted specific chat phrase, its answer phrase, and preceding and subsequent phrases of the deleted specific chat phrase.

If an answer phrase to a specific chat phrase among a plurality of chat phrases in a messenger chat window is entered, the controller 110 displays the entered answer phrase in the lower side of the specific chat phrase. At the same time, the controller 110 transmits, to the counterpart terminal, messenger information including the specific chat phrase, index information of the specific chat phrase, an answer phrase to the specific chat phrase, and a phone number of the counterpart terminal.

Upon receiving from the counterpart terminal an acknowledgement signal including a specific value indicating that a specific chat phrase is deleted, the controller 110 may transmit, to the counterpart terminal, an image obtained by capturing the specific chat phrase, an answer phrase to the specific chat phrase, and preceding and subsequent phrases of the specific chat phrase.

A camera unit 140 includes a camera sensor for capturing image data and converting the captured optical image signals into electrical image signals, and a signal processor for converting analog image signals captured by the camera sensor into digital image data. The camera sensor is assumed to be a Charge-Coupled Device (CCD) or Complementary Metal-Oxide Semiconductor (CMOS) sensor, and the signal processor may be implemented with a Digital Signal Processor (DSP). The camera sensor and the signal processor may be implemented integrally or separately.

An image processor 150 performs Image Signal Processing (ISP) to display the image signals output from the camera unit 140 on the display 160. The ISP includes gamma correction, interpolation, spatial variation, image effects, image scaling, Auto White Balance (AWB), Auto Exposure (AE), Auto Focus (AF) and the like. The image processor 150 processes the image signals output from the camera unit 140 on a frame basis, and outputs frame image data according to the characteristics and size of the display 160. The image processor 150, which includes a video codec, compresses the frame image data displayed on the display 160 and decompresses (or restores) the compressed frame image data to its original frame image data, using a set coding scheme. The video codec may be a Joint Photographic Experts Group (JPEG) codec, a Moving Picture Experts Group 4 (MPEG4) codec, a Wavelet codec, or the like. The image processor 150 is assumed to have an On Screen Display (OSD) function, and may output OSD data depending on the size of the displayed screen under the control of the controller 110.

The display 160 displays, on its screen, the image signals output from the image processor 150 and the user data output from the controller 110. The display 160 may be implemented with a Liquid Crystal Display (LCD). In this case, the display 160 may include an LCD controller, a memory for storing image data, and an LCD panel. When implemented in a touch screen fashion, the LCD panel may serve as an input unit, and the same keys as those of the key input unit 127 may be displayed on the display 160.

If the display 160 is used as a touch screen unit as it is implemented in a touch screen fashion, the touch screen unit is comprised of a Touch Screen Panel (TSP) including a plurality of sensor panels, and the sensor panels may include a capacitive sensor panel capable of detecting touches by a fingertip and an electromagnetic induction sensor panel capable of detecting fine touches by a touch pen such as a stylus pen.

In accordance with an exemplary embodiment of the present invention, the display 160 may display an answer phrase in the lower side of a specific chat phrase among a plurality of chat phrases in a messenger chat window.

The display 160 may display a deleted specific chat phrase among a plurality of chat phrases in the messenger chat window, and display an answer phrase received from a counterpart terminal, in the lower side of the deleted specific chat phrase.

An operation of selectively providing an answer phrase to a plurality of chat phrases in a messenger chat window in a terminal will be described in detail with reference to FIGS. 3 to 9C.

Figure 3:
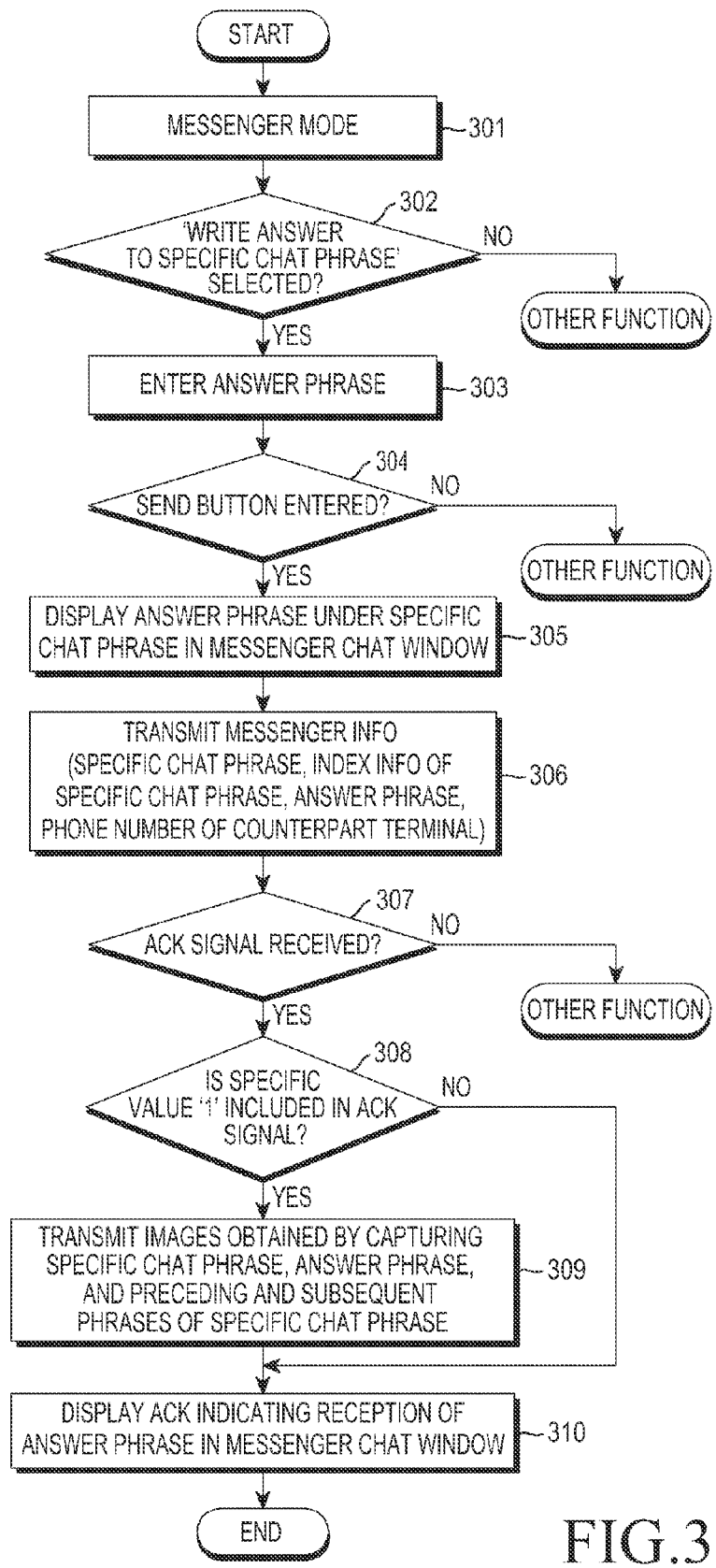
FIG. 3 illustrates a process of entering and sending an answer phrase to a specific chat phrase among a plurality of chat phrases in a messenger chat window in a terminal according to an exemplary embodiment of the present invention.

FIG. 3 illustrates a process of entering and sending an answer phrase to a specific chat phrase among a plurality of chat phrases in a messenger chat window in a terminal according to an exemplary embodiment of the present invention.

Exemplary embodiments of the present invention will be described in detail below with reference to FIGS. 2 and 3.

Referring to FIG. 3, in step 301 or in a messenger mode where a specific messenger application is executed in a terminal, the terminal displays a messenger chat window in which the terminal displays a chat phrase received from a counterpart terminal that is executing the same messenger, and also displays a chat phrase which is entered in the terminal.

The controller 110 determines in step 302 whether 'Write Answer to Specific Chat Phrase' is selected for a specific chat phrase among a plurality of chat phrases which are received from the counterpart terminal and displayed in the messenger chat window. If 'Write Answer to Specific Chat Phrase' is not selected, the controller 110 performs another function. If 'Write Answer to Specific Chat Phrase' is selected, the controller 110 switches to an answer entry mode. Selecting 'Write Answer to Specific Chat Phrase' may be achieved by long-touching the specific chat phrase.

After an answer phrase is entered in an input window in step 303, the controller 110 determines in step 304 whether a Send button is entered. If the Send button is not entered, the controller 110 performs another function. If the Send button is entered, the controller 110 displays the entered answer phrase in the lower side of the specific chat phrase in the messenger chat window in step 305. At the same time, the controller 110 transmits messenger information to the counterpart terminal via a server in step 306, the messenger information including the specific chat phrase, index information of the specific chat phrase, the answer phrase to the specific chat phrase, and a phone number of the counterpart terminal.

Thereafter, the controller 110 determines in step 307 whether an acknowledgement signal indicating reception of the answer phrase is received from the counterpart terminal. Upon receiving the acknowledgement signal, the controller 110 checks a specific value included in the received acknowledgement signal. If the controller 110 determines that acknowledgement signal indicating reception of the answer phrase is not received from the counterpart terminal, the controller 110 performs another function.

The controller 110 determines in step 308 whether the specific value included in the acknowledgement signal is a specific value of '0' indicating that the specific chat phrase is not deleted. If so, the controller 110 displays in step 310 an acknowledgement indicating reception of the answer phrase at the counterpart terminal, in the answer phrase displayed in the lower side of the specific chat phrase in the messenger chat window.

The controller 110 determines in step 308 whether the specific value included in the acknowledgement signal is a specific value of '1' indicating that the specific chat phrase is deleted. If so, the controller 110 transmits, as a related image of the deleted specific chat phrase, an image obtained by capturing the specific chat phrase, the answer phrase to the specific chat phrase and a predetermined number of preceding and subsequent chat phrases of the specific chat phrase, to the counterpart terminal in step 309.

The same chat phrases are displayed in the messenger chat window between at least two terminals which are executing the same messenger in the messenger mode. However, if a specific chat phrase among the plurality of chat phrases is deleted in any one of the two terminals, the other terminal may display the deleted specific chat phrase in its messenger chat window, without knowing the deletion of the specific chat phrase.

Therefore, if the terminal has known that the terminal sent an answer phrase to a specific chat phrase but the specific chat phrase was deleted in the counterpart terminal, the terminal generates an image by capturing a predetermined number of preceding and subsequent chat phrases of the deleted specific chat phrase, and transmits it to the counterpart terminal, allowing the user of the counterpart terminal to determine the contents of the answer phrase to the deleted specific chat phrase by viewing and reading the preceding and subsequent chat phrases. An operation of the counterpart terminal to notify the deletion of the specific chat phrase will be described in detail further below with reference to FIG. 6B.

After transmitting the generated image to the counterpart terminal as a related image of the deleted specific chat phrase, the terminal proceeds to step 310.

The operation in FIG. 3 will be described, by way of example, with reference to FIGS. 4A to 4D, 5A and 5B. FIGS. 4A to 4D, 5A and 5B illustrate a messenger operation performed between a first terminal A and a second terminal B having the same components as those in FIG. 2.

FIGS. 4A to 4D illustrate a messenger chat window displayed on a display of the second terminal B according to an exemplary embodiment of the present invention. Chat phrases received from the first terminal A or counterpart terminal are displayed in the left side of the messenger chat window, while chat phrases entered in the second terminal B are displayed in the right side thereof.

Figure 5A:
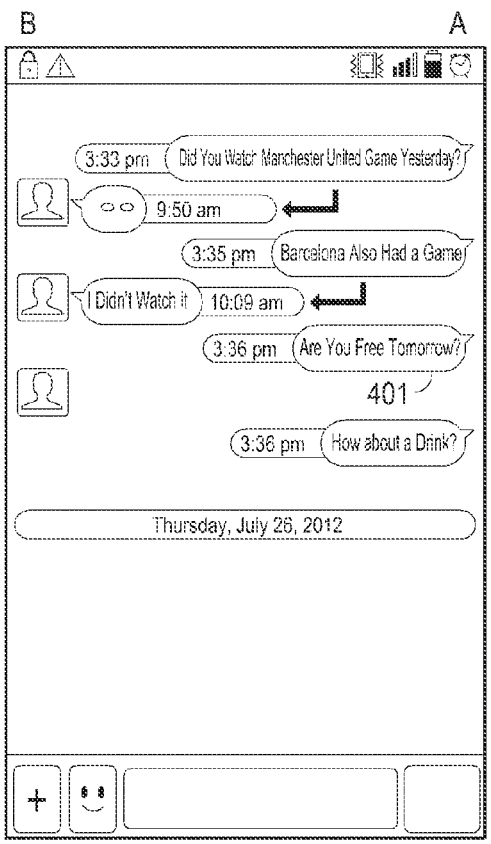
Figure 5B:
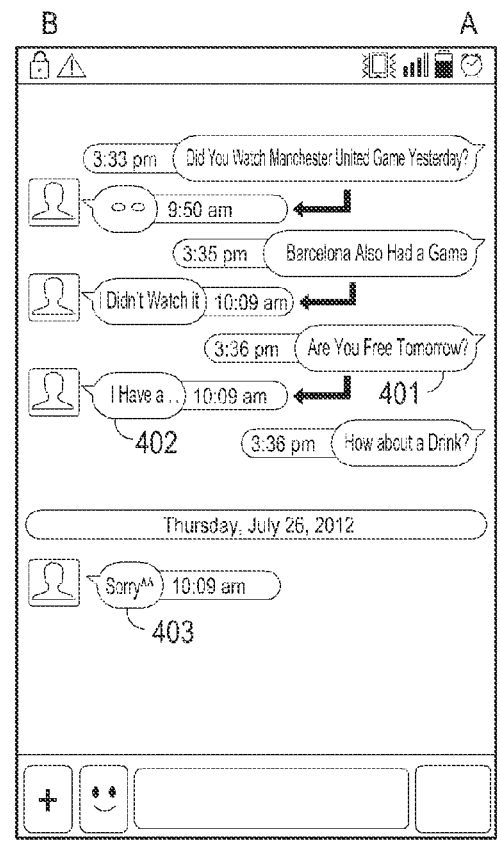

FIGS. 5A and 5B illustrate a messenger chat window displayed on a display of the first terminal A according to an exemplary embodiment of the present invention. Chat phrases received from the second terminal B or a counterpart terminal are displayed in the left side of the messenger chat window, while chat phrases entered in the first terminal A are displayed in the right side thereof.

Figure 4A:
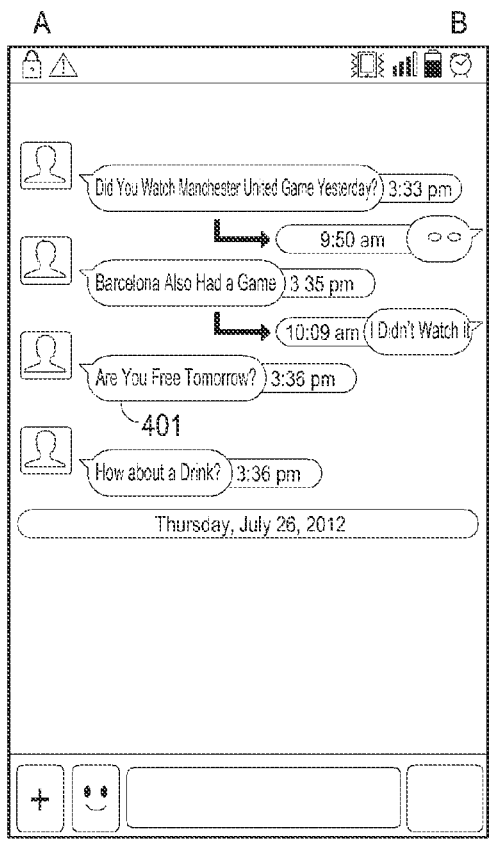
FIGS. 4A to 4D, 5A and 5B illustrate examples of a messenger chat window, which are given for a description of the process illustrated in FIG. 3 according to an exemplary embodiment of the present invention.
Figure 4B:
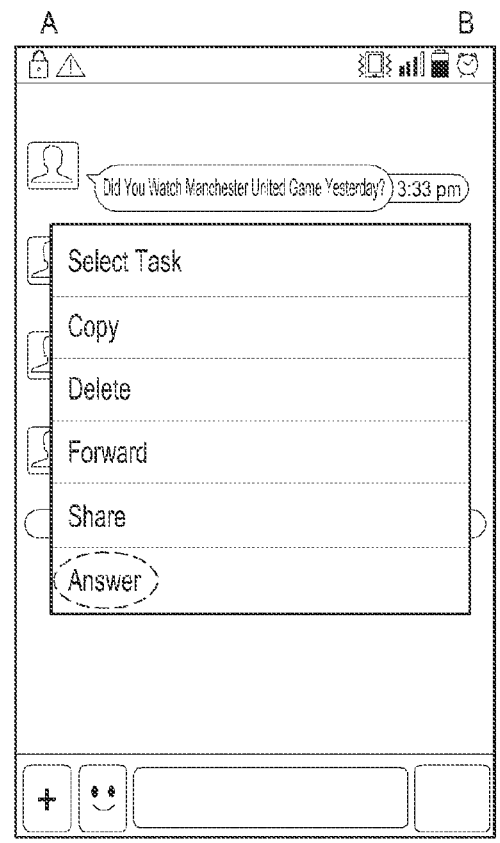
Figure 4C:
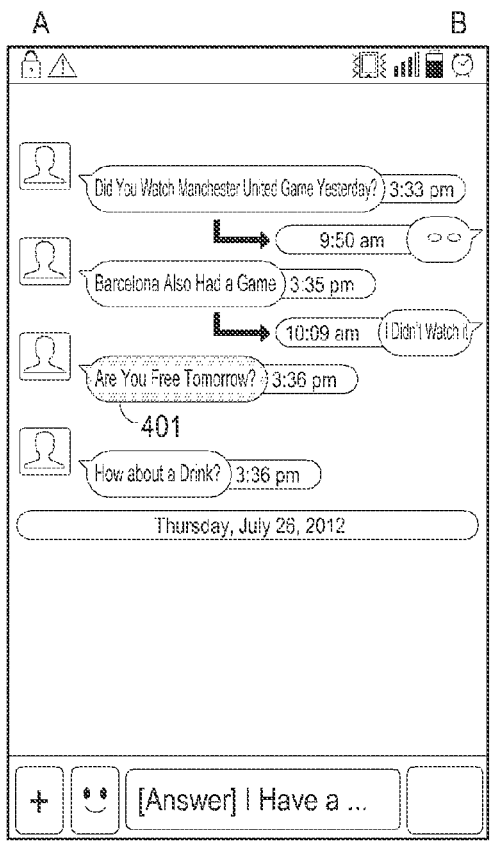
Figure 4D:
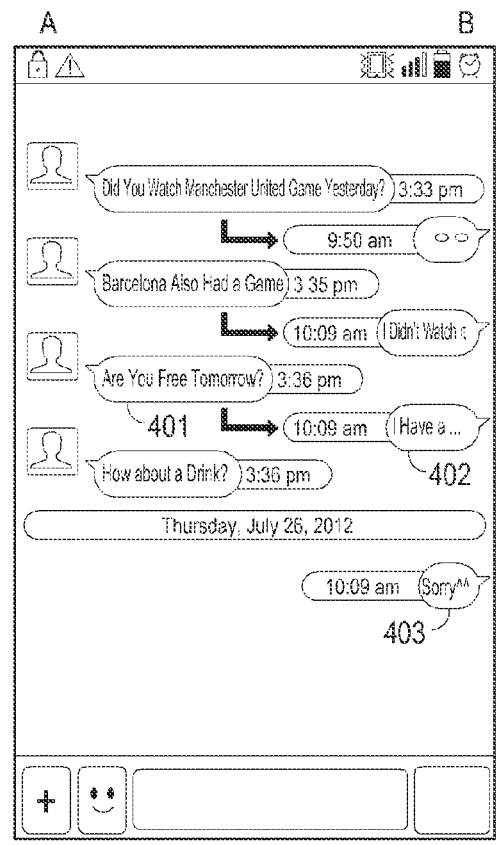

If a third chat phrase 401 among four displayed chat phrases received from the first terminal A is long-touched as illustrated in FIG. 4A while a messenger is executed between the first terminal A and the second terminal B, types of available menus are displayed in a pop-up window as illustrated in FIG. 4B. If 'Answer' among them is selected, the long-touched third chat phrase 401, as illustrated in FIG. 4C, may be highlighted or its color may be changed to indicate that it is selected as a chat phrase to which a user of the second terminal B will enter an answer phrase. In addition, a word '[Answer]' indicating an answer phrase is displayed in an input window. If an answer phrase is written and a Send button is entered by the user of the second terminal B, the answer phrase 402 is displayed in the lower side of the long-touched third chat phrase 401 as illustrated in FIG. 4D.

As the Send button is entered, the second terminal B generates first messenger information (including the third chat phrase, index information of the third chat phrase, the answer phrase, and a phone number of the first terminal A), and transmits the first messenger information to a server, and the server checks the phone number of the first terminal A, included in the first messenger information, and transmits the first messenger information to the first terminal A.

As illustrated in FIGS. 4A to 4D, if it is assumed that the total number of displayed chat phrases received from the first terminal A is 4, index information of the third chat phrase, which is included in the messenger information, is '3', and index information of the answer phrase to the third chat phrase is '3-1'.

After the answer phrase to the third chat phrase 401 is written and a Send button is entered, if a new chat phrase 402 is written in the input window and the Send button is entered, the second terminal B displays the new chat phrase 402 in the lowest side of the messenger chat window in chronological order, generates second messenger information (including the new chat phrase and a phone number of the first terminal A), and transmits the second messenger information to the server. The server checks the phone number of the first terminal A, which is included in the second messenger information, and transmits the second messenger information to the first terminal A.

Upon receiving the first messenger information from the server while the first terminal A displays a messenger chat window as illustrated in FIG. 5A, the first terminal A determines that the first messenger information is an answer phrase to a specific chat phrase, based on the chat phrase included in the first messenger information. After detecting the third chat phrase from the first messenger information, or detecting the position of the same chat phrase (i.e., third chat phrase) in its messenger chat window based on the index information ('3') of the third chat phrase, the first terminal A displays the answer phrase in the lower side of the detected chat phrase as illustrated in FIG. 5B. The first terminal A generates index information of the received answer phrase as '3-1'.

Thereafter, upon receiving the second messenger information from the server, the first terminal A detects a new chat phrase 403 included in the second messenger information and displays it in the lowest side of the messenger chat window in chronological order, since no answer phrase is included in the second messenger information.

Figure 6A:
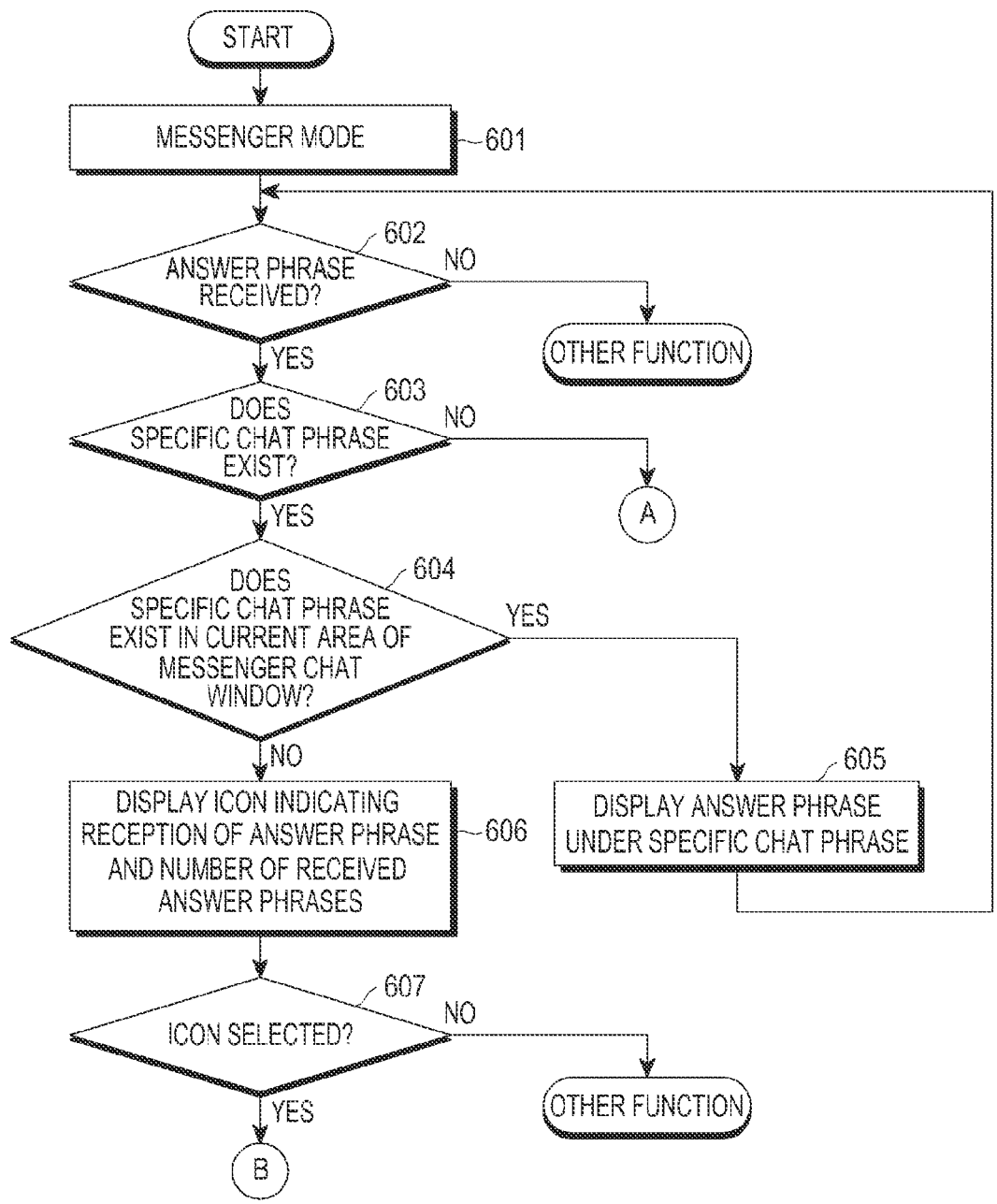
FIGS. 6A and 6B illustrate a process of receiving and handling an answer phrase to a specific chat phrase, which is not displayed in the current area of a messenger chat window, in a terminal according to an exemplary embodiment of the present invention.
Figure 6B:
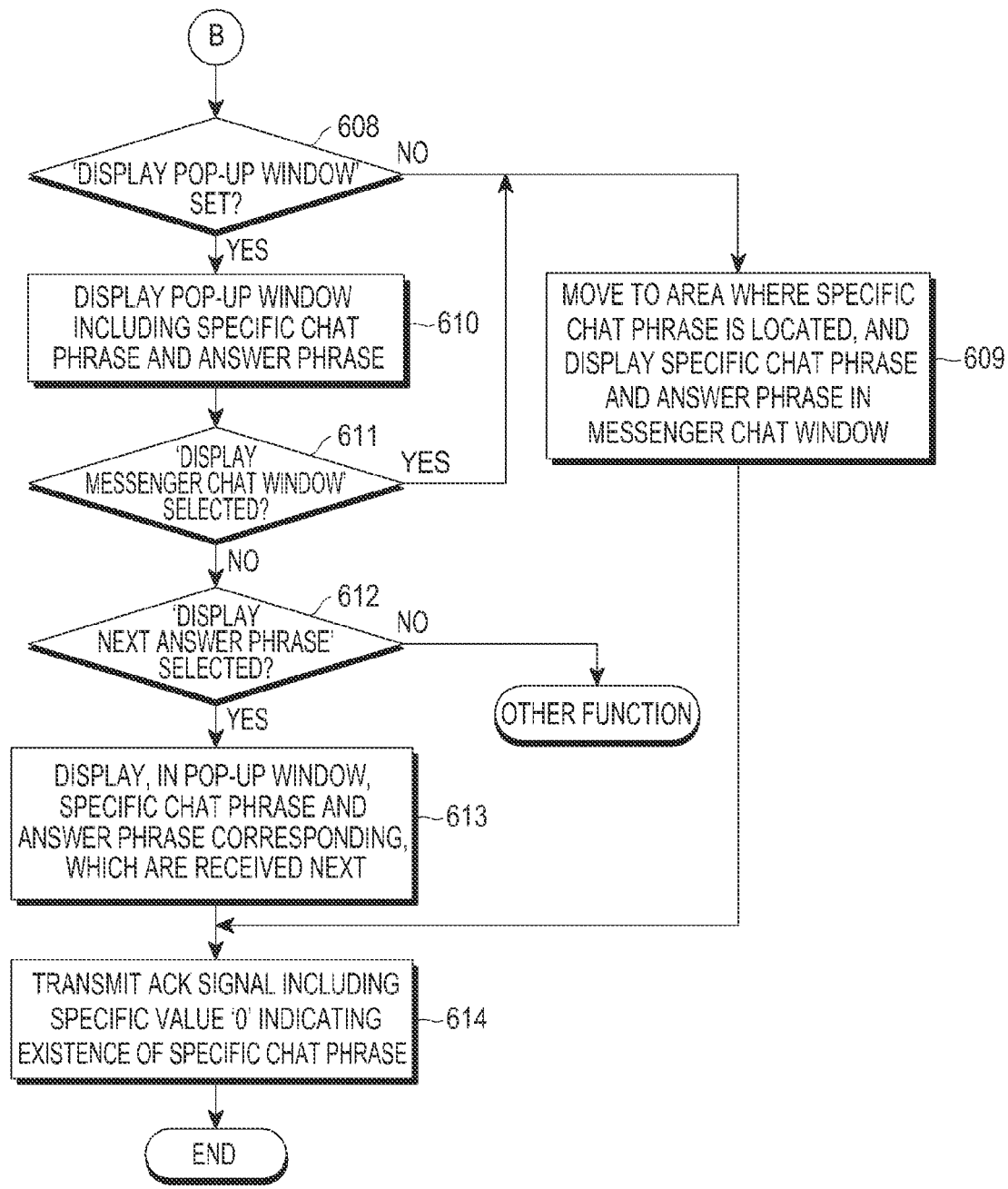
Figure 6C:
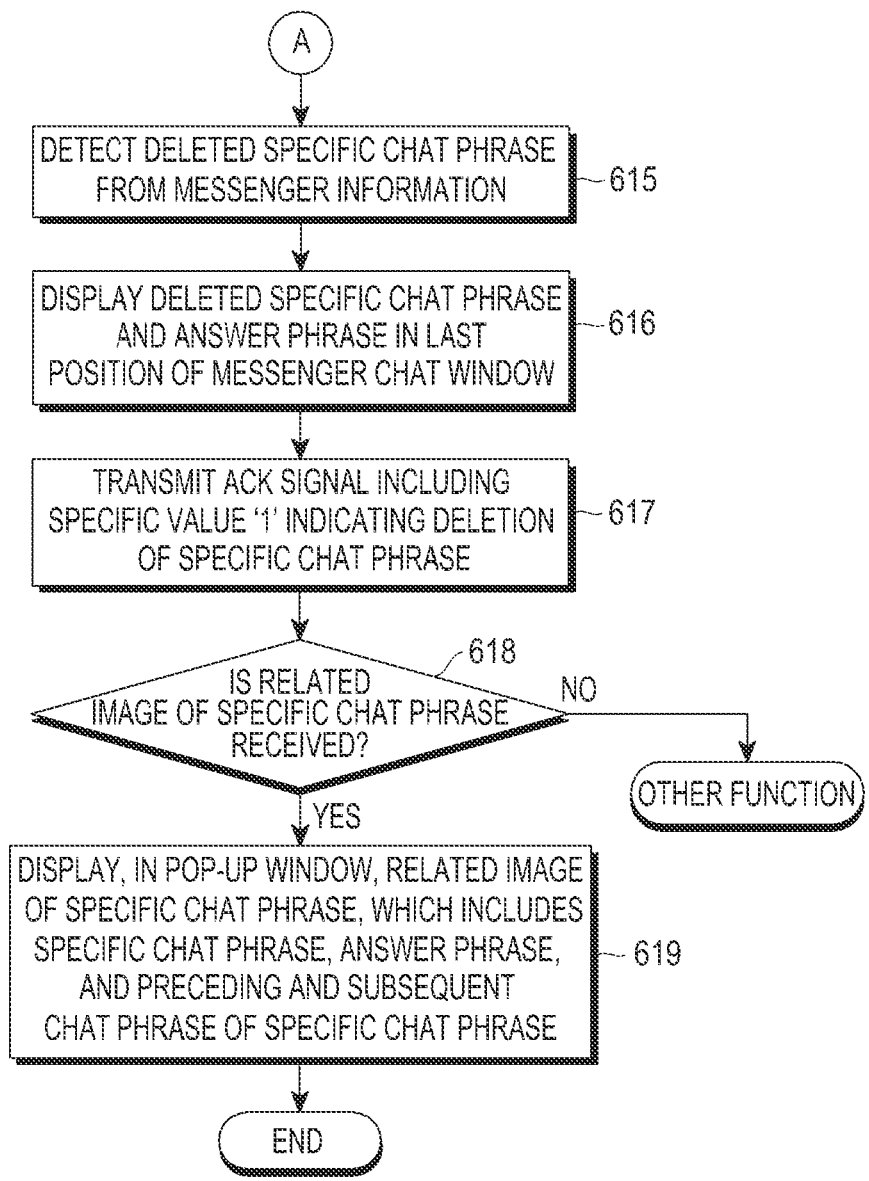
FIG. 6C illustrates a process of receiving and handling an answer phrase to a specific chat phrase, which is deleted from a messenger chat window, in a terminal according to an exemplary embodiment of the present invention.

FIGS. 6A and 6B illustrate a process of receiving and handling an answer phrase to a specific chat phrase, which is not displayed in the current area of a messenger chat window, in a terminal according to an exemplary embodiment of the present invention. FIG. 6C illustrates a process of receiving and handling an answer phrase to a specific chat phrase, which is deleted from a messenger chat window, in a terminal according to an exemplary embodiment of the present invention.

Exemplary embodiments of the present invention will be described in detail below with reference to FIGS. 2 and 6A to 6C.

FIGS. 6A and 6B illustrate a process of receiving and handling an answer phrase to a specific chat phrase, which is not displayed in a display area of a messenger chat window according to an exemplary embodiment of the present invention.

Referring to FIG. 6A, in step 601 or in a messenger mode where a specific messenger application is executed in a terminal, the terminal displays a messenger chat window in which the terminal displays a chat phrase received from a counterpart terminal that is executing the same messenger, and also displays a chat phrase which is entered in the terminal.

Upon receiving messenger information from the counterpart terminal via a server, the controller 110 determines in step 602 whether an answer phrase exists in the messenger information. If an answer phrase does not exist in the messenger information, the controller 110 performs another function. If an answer phrase exists in the messenger information, the controller 110 determines in step 603 whether a specific chat phrase associated with the answer phrase exists among a plurality of chat phrases in the messenger chat window, based on at least one of the specific chat phrase associated with the answer phrase and the index information of the specific chat phrase, which are included in the messenger information. If the specific chat phrase associated with the answer phrase does not exist, the controller 110 proceeds to step 615 of FIG. 6C which is described further below.

If the specific chat phrase associated with the answer phrase exists, the controller 110 determines in step 604 whether the specific chat phrase exists in the current display area of the messenger chat window.

If the specific chat phrase exists in the display area of the messenger chat window, the controller 110 displays the received answer phrase in the lower side of the specific chat phrase and generates index information of the answer phrase in step 605. Thereafter, the controller 110 returns to step 602.

However, if the specific chat phrase does not exist in the display area of the messenger chat window, the controller 110 detects the position area where the specific chat phrase among the plurality of chat phrases in the messenger chat window is displayed, and displays the answer phrase in the lower side of the detected specific chat phrase. At the same time, the controller 110 displays a specific icon in a specific area of the messenger chat window to notify reception of the answer phrase, and also displays the number of received answer phrases, in step 606.

The controller 110 determines in step 607 whether the specific icon displayed to notify reception of the answer phrase is selected or touched. If the specific icon is not selected, the controller 110 performs another function. If the specific icon is selected, the controller 110 determines in step 608 whether 'Display Answer Phrase' is set as 'Display Pop-Up Window'. The controller 110 decreases the displayed number of received answer phrases each time the user selects the icon to view or read the answer phrases.

If 'Display Answer Phrase' is not set as 'Display Pop-Up Window', the controller 110 moves to the position area of the specific chat phrase and displays the specific chat phrase and the answer phrase located in the lower side of the specific chat phrase, in step 609. In response to the mere selection of the icon, the controller 110 may directly move to the position of the received answer phrase which is not displayed in the current area of the messenger chat window, allowing the user to conveniently check the received answer phrase. Thereafter, the controller 110 proceeds to step 614 which is described below.

If 'Display Answer Phrase' is set as 'Display Pop-Up Window', the controller 110 displays a separate pop-up window including the specific chat phrase and the answer phrase located in the lower side of the specific chat phrase, in step 610.

In step 610, the controller 110 may display, in the pop-up window, not only the specific chat phrase and the answer phrase, but also an image obtained by capturing a predetermined number of preceding and subsequent chat phrases of the specific chat phrase.

By displaying a predetermined number of preceding and subsequent chat phrases of the specific chat phrase together in the pop-up window displayed to allow the user to check the received answer phrase which is not displayed in the current area of the messenger chat window, the controller 110 may allow the user to easily check the then-chat contents.

The controller 110 determines in step 611 whether 'Display Messenger Chat Window' is selected among the menus in the pop-up window while displaying the pop-up window. If 'Display Messenger Chat Window' is selected, the controller 110 moves from the current area of the messenger chat window to the position area of the specific chat phrase and displays the specific chat phrase and the answer phrase located in the lower side of the specific chat phrase in the messenger chat window, in step 609.

If 'Display Messenger Chat Window' is not selected among the menus in the pop-up window while displaying the pop-up window, the controller 110 determines in step 612 whether 'Display Next Answer Phrase' is selected, or whether there is any answer phrase, which has not been checked (or read) by the user, among the received answer phrases. If 'Display Next Answer Phrase' is not selected, the controller 110 performs another function.

If 'Display Next Answer Phrase' is selected, or there is an answer phrase, which has not been checked by the user, the controller 110 sequentially displays in the pop-up window a specific chat phrase associated with an answer phrase, which is received next, and the answer phrase located in the lower side of the specific chat phrase, in step 613.

In step 614, each time the received answer phrase is checked or read by the user, the controller 110 transmits an acknowledgement signal indicating reception of the answer phrase, to the counterpart terminal. The controller 110 transmits the acknowledgement signal to the counterpart terminal, together with a specific value of '0' indicating that a specific chat phrase associated with the received answer phrase is present among the plurality of chat phrases in the messenger chat window.

FIG. 6C illustrates a process of receiving and handling an answer phrase to a deleted specific chat phrase among a plurality of chat phrases in a messenger chat window according to an exemplary embodiment of the present invention.

Referring to FIG. 6C, if it is determined in step 603 of FIG. 6A that the specific chat phrase or index information of the specific chat phrase, which is included in the messenger information received from the counterpart terminal, does not exist among the plurality of chat phrases in the messenger chat window, i.e., if the specific chat phrase is deleted, the controller 110 detects the deleted specific chat phrase from the messenger information in step 615.

In step 616, the controller 110 displays the specific chat phrase detected from the messenger information in the lowest side of the messenger chat window, i.e., in the last position in the chronological order, and displays the answer phrase detected from the messenger information in the lower side of the specific chat phrase. The controller 110 may display the answer phrase detected from the messenger information using a specific color to indicate that it is a deleted chat phrase.

In step 617, the controller 110 transmits to the counterpart terminal an acknowledgement signal indicating reception of the answer phrase. The controller 110 transmits the acknowledgement signal to the counterpart terminal, together with a specific value of '1' indicating that a specific chat phrase associated with the received answer phrase is deleted from among the plurality of chat phrases in the messenger chat window.

An operation that the counterpart terminal performs upon receiving from the terminal the acknowledgement signal including a specific value of '1' indicating that a specific chat phrase associated with the answer phrase is deleted from among the plurality of chat phrases in the messenger chat window, is the same as the operation in steps 307 to 309 in FIG. 3.

Thereafter, the controller 110 determines in step 618 whether a related image of the deleted specific chat phrase is received from the counterpart terminal. If a related image of the deleted specific chat phrase is not received, the controller 110 performs another function. If a related image of the deleted specific chat phrase is received, the controller 110 displays in a separate pop-up window not only the deleted specific chat phrase and the answer phrase, but also a predetermined number of preceding and subsequent chat phrases of the deleted specific chat phrase to allow the user to easily check the then-chat contents, in step 619.

The operations in FIGS. 6A to 6C will be described, by way of example, with reference to FIGS. 7A to 7D, 8B to 8C and 9A to 9C.

FIGS. 7A to 7D, 8B to 8C and 9A to 9C illustrate a messenger operation performed between a first terminal A and a second terminal B having the same components as those in FIG. 2 according to an exemplary embodiment of the present invention.

FIGS. 7A to 7D illustrate a messenger chat window displayed on a display of the second terminal B according to an exemplary embodiment of the present invention. Chat phrases received from the first terminal A or a counterpart terminal are displayed in the left side of the messenger chat window, while chat phrases entered in the second terminal B are displayed in the right side thereof.

FIGS. 8A to 8C and 9A to 9C illustrate a messenger chat window displayed on a display of the first terminal A according to an exemplary embodiment of the present invention. Chat phrases received from the second terminal B or a counterpart terminal are displayed in the left side of the messenger chat window, while chat phrases entered in the first terminal A are displayed in the right side thereof.

Figure 7A:
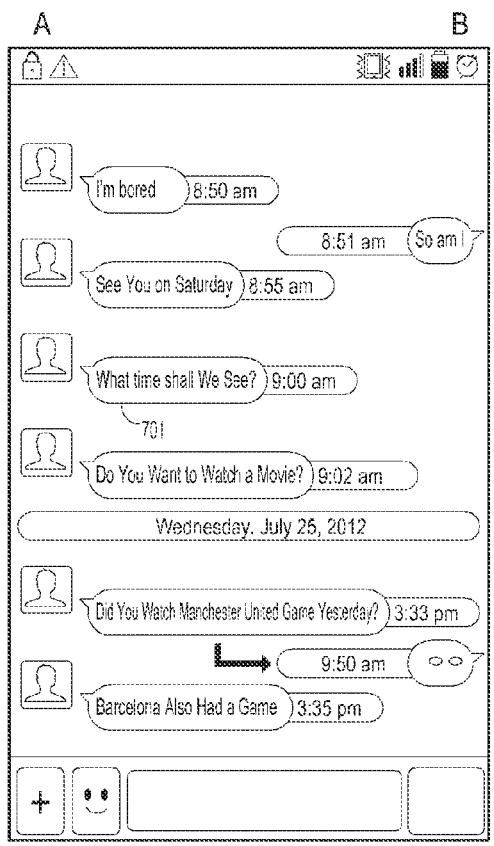
FIGS. 7A to 7D, 8A to 8C, and 9A to 9C illustrate examples of a messenger chat window, which are given for a description of the process illustrated in FIGS. 6A to 6C according to an exemplary embodiment of the present invention.
Figure 7B:
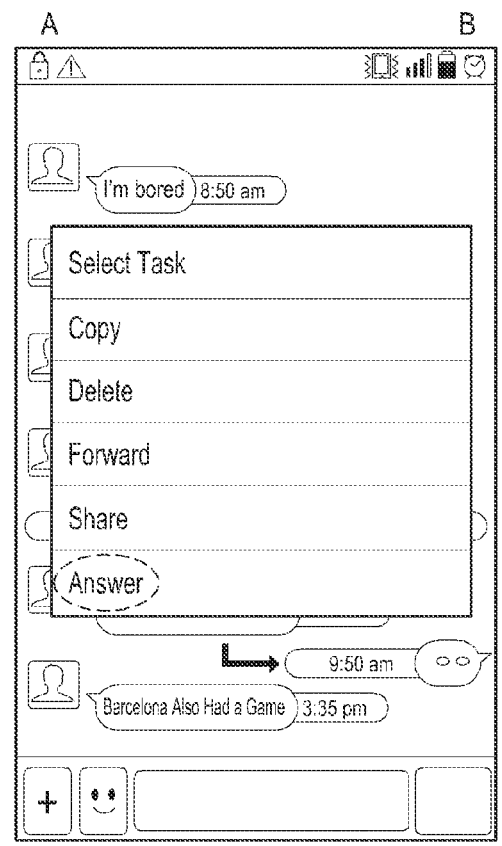
Figure 7C:
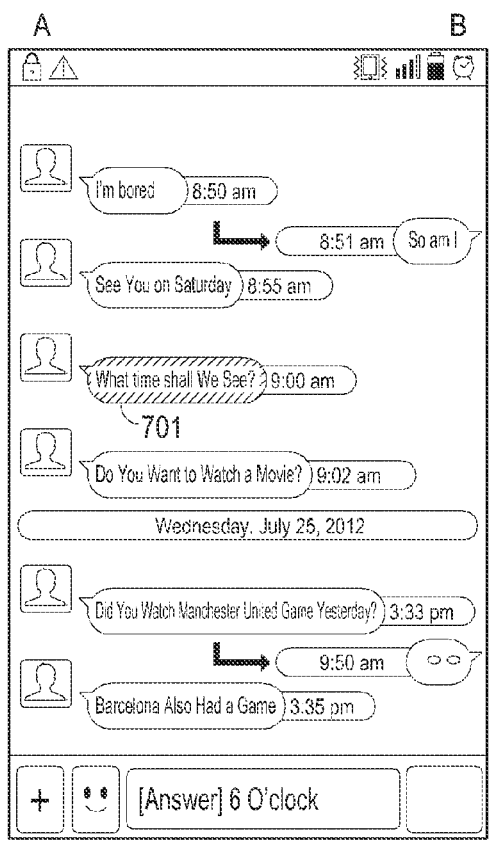
Figure 7D:
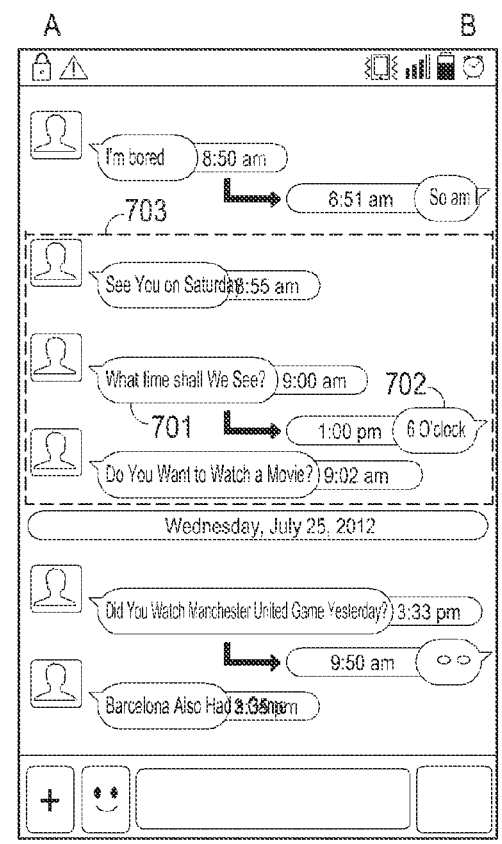

If a third chat phrase 701 among four displayed chat phrases received from the first terminal A is long-touched as illustrated in FIG. 7A while a messenger is executed between the first terminal A and the second terminal B, types of available menus are displayed in a pop-up window as illustrated in FIG. 7B. If 'Answer' among them is selected, the long-touched third chat phrase 701, as illustrated in FIG. 7C, may be highlighted or its color may be changed to indicate that it is selected as a chat phrase to which a user of the second terminal B will enter an answer phrase. In addition, a word '[Answer]' indicating an answer phrase is displayed in an input window. If an answer phrase is written and a Send button is entered by the user of the second terminal B, the answer phrase 702 is displayed in the lower side of the long-touched third chat phrase 701 as illustrated in FIG. 7D.

As the Send button is entered, the second terminal B generates messenger information (including the third chat phrase, index information '3' of the third chat phrase, the answer phrase, and a phone number of the first terminal A), and transmits the messenger information to a server, and the server checks the phone number of the first terminal A, included in the messenger information, and transmits the messenger information to the first terminal A.

As illustrated in FIGS. 7A to 7D, if it is assumed that the total number of displayed chat phrases received from the first terminal A is 4, index information of the third chat phrase, which is included in the messenger information, is '3', and index information of the answer phrase to the third chat phrase is '3-1'.

A process of handling an answer phrase to a specific chat phrase, which is not displayed in the current area of a messenger chat window, such as in FIG. 6A, will be described, by way of example, with reference to FIGS. 8A to 8C.

Figure 8A:
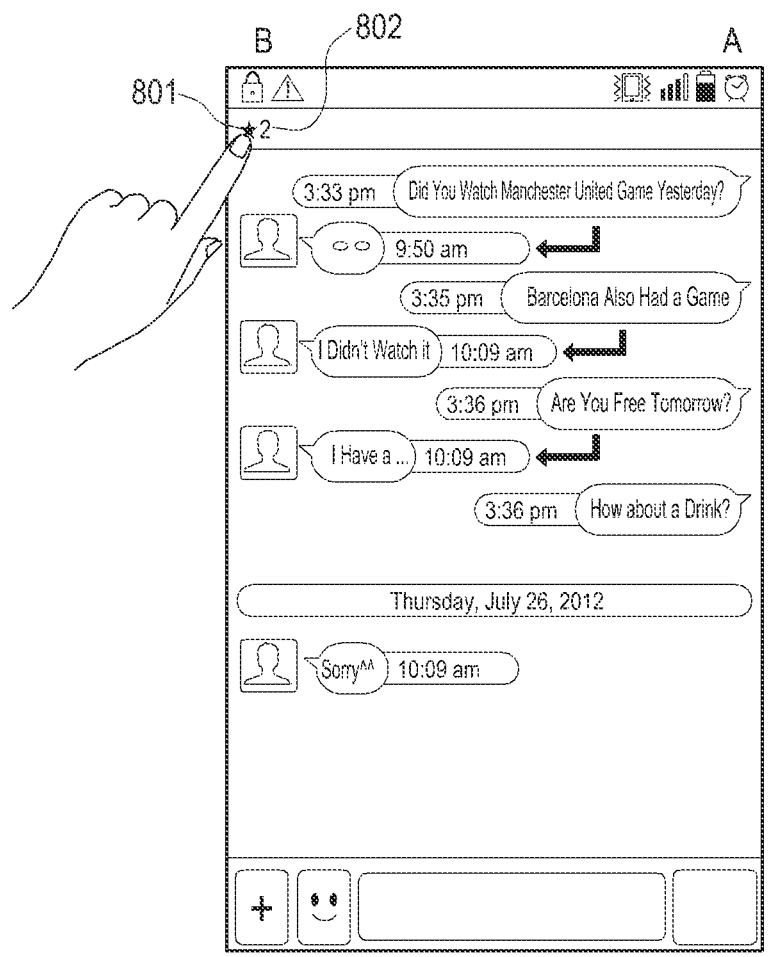

Upon receiving first messenger information of the second terminal B from the server while the first terminal A displays the messenger chat window of FIG. 8A, the first terminal A determines that the first messenger information is an answer phrase to a specific chat phrase, based on the answer phrase included in the first messenger information. The first terminal A determines whether the same chat phrase, i.e., the third chat phrase, exists in its messenger chat window, based on third chat phrase or index information of the third chat phrase, which is included in the messenger information.

If the third chat phrase included in the messenger information exists among the plurality of chat phrases in the messenger chat window, the first terminal A determines whether the third chat phrase exists among the plurality of chat phrases which are displayed in the display area of the messenger chat window that the user of the first terminal A is watching.

If the third chat phrase is not displayed in the display area of the messenger chat window of the first terminal A, the first terminal A displays an icon 801 indicating reception of the answer phrase and the number 802 of received answer phrases in a predetermined area (for example, an upper side) of the messenger chat window.

Figure 8B:
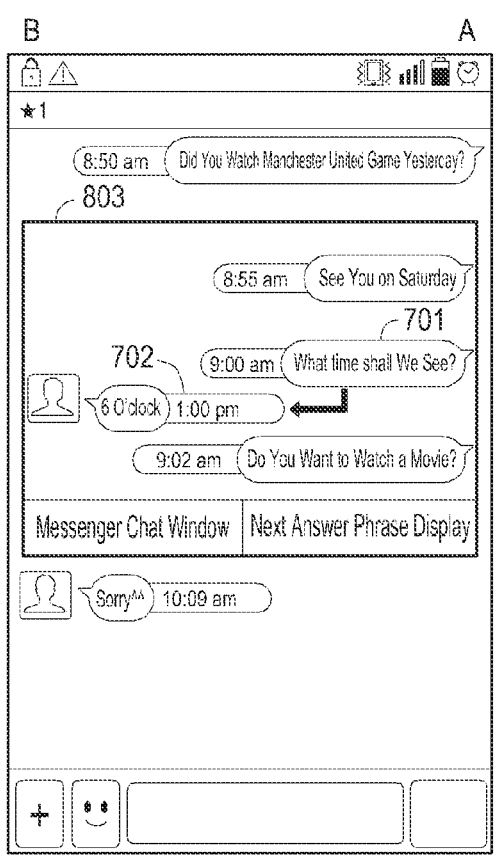
Figure 8C:
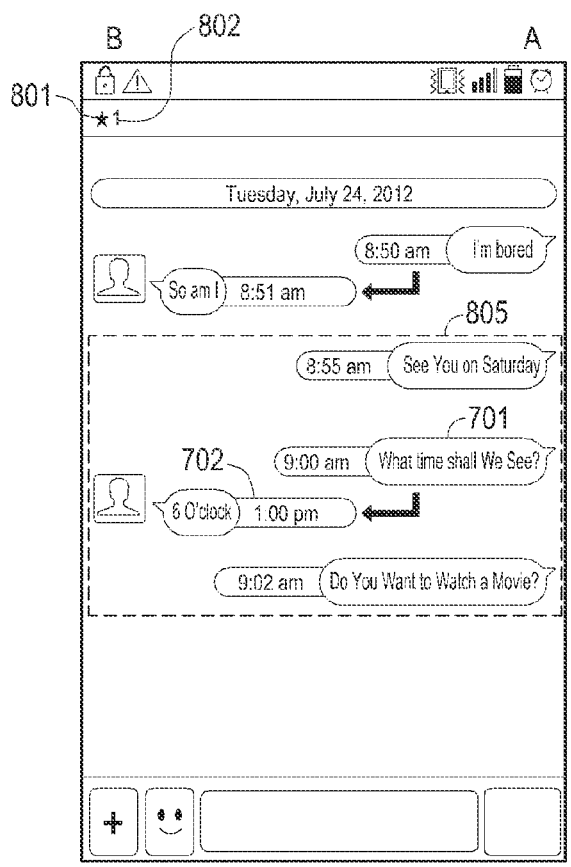

If the icon 801 indicating reception of the answer phrase is selected in FIG. 8A, the first terminal A may directly move to the position area where the third chat phrase among the plurality of chat phrases in the messenger chat window is displayed, and display in the messenger chat window the third chat phrase 701 and the answer phrase 702 located in the lower side of the third chat phrase, as illustrated in FIG. 8C. Index information of the answer phrase is '3-1'.

If 'Display Answer Phrase' is set as 'Display Pop-Up Window' while the third chat phrase is not displayed in the current area of the messenger chat window of the first terminal A, a separate pop-up window 803 is displayed as illustrated in FIG. 8B, as the icon 801 indicating reception of the answer phrase is selected in FIG. 8A.

The first terminal A may capture preceding and subsequent chat phrases (805 in FIG. 8C) of the third chat phrase 701, and display, in the pop-up window 803 of FIG. 8B, the third chat phrase 701, the answer phrase 702, and the preceding and subsequent chat phrases of the third chat phrase 701 together.

If a 'Move' menu is selected in the pop-up window 803, the first terminal A, as illustrated in FIG. 8C, moves to the position area where the third chat phrase is displayed, and displays, in the messenger chat window, a plurality of chat phrases, including the third chat phrase 701 and the chat phrase 702 located in the lower side of the third chat phrase.

If a 'Display Next Answer Phrase' menu is selected in the pop-up window 803, the first terminal A displays in the pop-up window a specific chat phrase associated with the next answer phrase, which has not been read, and the answer phrase.

Next, an operation of handling an answer phrase to a deleted chat phrase among a plurality of chat phrases in the messenger chat window, like in FIG. 6B, will be described, by way of example, with reference to FIGS. 9A to 9C.

Figure 9A:
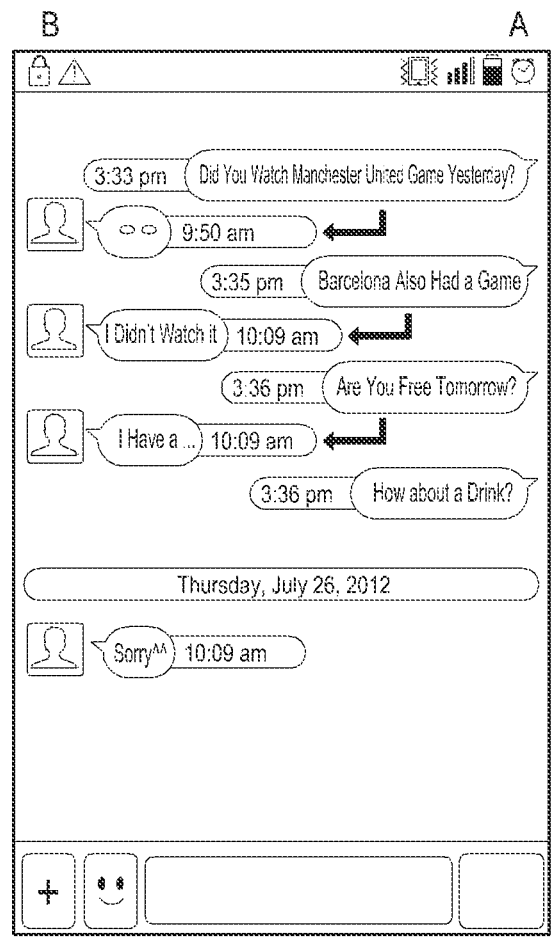

Upon receiving messenger information of the second terminal B from the server while the first terminal A displays a messenger chat window of FIG. 9A, the first terminal A determines that the messenger information is an answer phrase to a specific chat phrase, based on the answer phrase included in the messenger information. The first terminal A determines whether the same chat phrase (i.e., the third chat phrase) exists in its messenger chat window, based on the third chat phrase or index information of the third chat phrase, which is included in the messenger information.

Figure 9B:
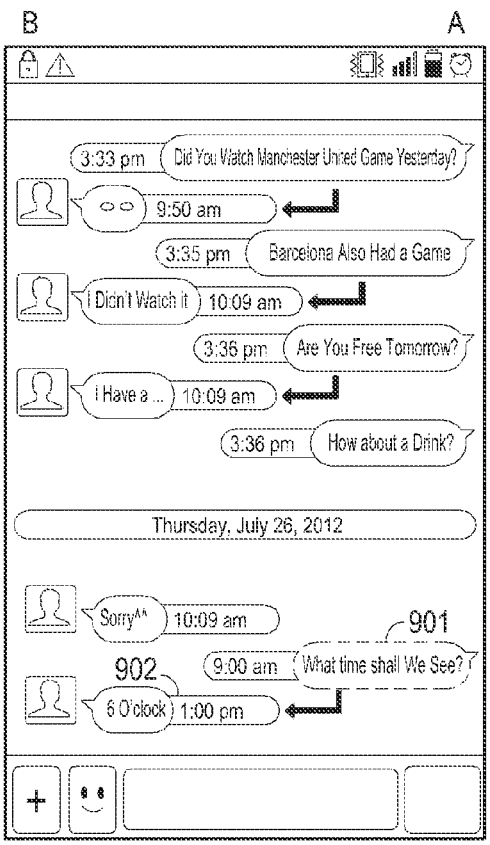

However, if the third chat phrase does not exist among the plurality of chat phrases in the messenger chat window, the terminal A, as illustrated in FIG. 9B, detects the third chat phrase 901 and the answer phrase 902 from the messenger information, and displays them in the last position of the messenger chat window. The terminal A may mark the third chat phrase 901 to indicate that it is a deleted chat phrase among the plurality of chat phrases in the messenger chat window, and may also generate index information of the answer phrase 902. As illustrated in FIG. 9A, if it is assumed that the total number of displayed chat phrases entered in the first terminal A is 4, index information of the answer phrase to the deleted third chat phrase may be '5' in order of being entered.

As the answer phrase is checked or read by the user, the first terminal A transmits to the second terminal B an acknowledgement signal including a specific value of '1' indicating that the third chat phrase is deleted.

In response, the second terminal B, as illustrated in FIG. 7D, transmits the image 703 obtained by capturing preceding and subsequent chat phrases of the third chat phrase, to the first terminal A as a related image of the deleted chat phrase.

Figure 9C:
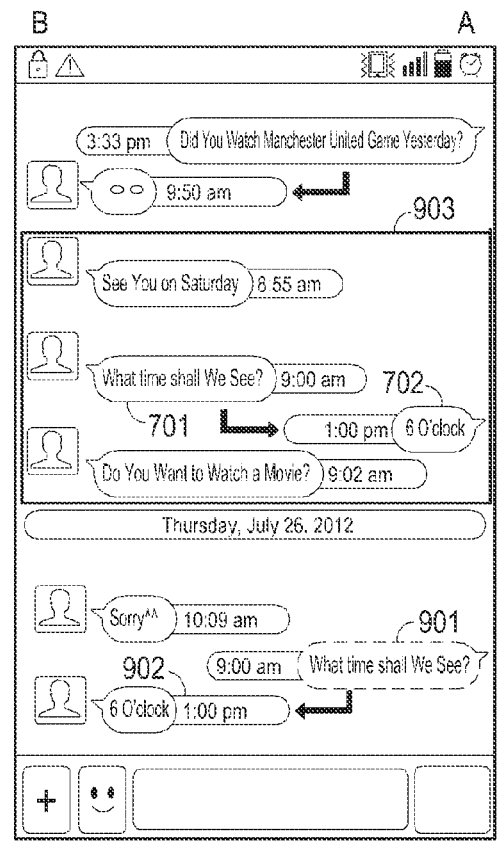

Then, the first terminal A, as illustrated in FIG. 9C, displays in a separate pop-up window 903 the related image 703 of the deleted chat phrase, which is received from the second terminal B.

Exemplary embodiments of the present invention may be implemented as computer-readable codes in non-transitory computer-readable media. The non-transitory computer-readable media may include all kinds of recording devices storing computer-readable data. Examples of the non-transitory computer-readable media may include Read Only Memory (ROM), Radon Access Memory (RAM), optical disk, magnetic tape, floppy disk, hard disk, non-volatile memory, and the like, and may also be implemented in the form carrier waves (for example, transmission over the Internet). The non-transitory computer-readable recording media may be distributed to computer systems connected by the network, and computer-readable codes may be stored and executed in a distributed manner.

As is apparent from the foregoing description, the proposed messenger control apparatus and method may allow the user to selectively make an answer to a plurality of chat phrases in the messenger chat window, and to immediately read the specific chat phrase and answer phrase, which are not displayed in the current area of the messenger chat window. In addition, upon receiving an answer phrase to a deleted specific chat phrase, the terminal may display the deleted chat phrase and its answer phrase together.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
a communication device configured to transmit or receive information;
a display; and
at least one processor configured to:
control the display to display a messenger chat window after receiving an indication at the portable terminal to execute a messenger chat application,
receive, from a second terminal, a first chat message corresponding to a second chat message previously transmitted from the portable terminal to the second terminal using the messenger chat application, the first chat message being transmitted by the second terminal and including index information associated with the second chat message,
determine whether the second chat message is currently displayed in the messenger chat window based on the index information associated with the second chat message received from the second terminal,
if the second chat message is currently displayed in the message chat window, control the display to display the first chat message directly adjacent to the second chat message in the message chat window,
if the second chat message is not currently displayed in the message chat window, control the display to display a notification that the first chat message has been received, and
if an input for displaying the first chat message is received in response to the notification that the first chat message has been received, retrieve the second chat message associated with the first chat message and control the display to display the first chat message and the second chat message within the messenger chat window after the input for displaying the first chat message is received.

2. The portable device of claim 1, wherein the index information associated with the second chat message includes at least one of:
information associated with a time at which the second terminal received the second chat message,
information associated with a time at which the second terminal transmitted the first chat message, and
a specific based on an order in which the first chat message is transmitted by the second terminal and the second chat message is received at the second terminal.

3. The portable device of claim 1,
wherein the at least one processor is further configured to:
control the display to display a notification based on an aggregate number of total chat messages received from the second terminal in the messenger chat window, and
wherein the aggregate number of total chat messages is based on a number of chat messages received from the second terminal in response to chat messages transmitted from the portable terminal that are not currently displayed in the messenger chat window.

4. The portable device of claim 1, wherein the at least one processor is further configured to:
control the display to decrease a number of chat messages displayed in the messenger chat window based on a number of inputs received for displaying chat messages in response to a notification that a chat message has been received from the second terminal.

5. The portable device of claim 1,
wherein the at least one processor is further configured to:
after the input for displaying the first chat message is received in response to the notification that the first chat message has been received, control the display to display a pop-up window over the messenger chat window if the second chat message is not currently displayed in the message chat window, and
wherein the pop-up window includes the first chat message and the second chat message.

6. The portable device of claim 5,
wherein the at least one processor is further configured to:
after the input for displaying the first chat message is received in response to the notification that the first chat message has been received, generate an image including the first chat message, the second chat message, and at least one chat message positioned above the second chat message in the message chat window or at least one chat message positioned below to the second chat message in the message chat window, and wherein the pop-up window includes the generated image.

7. The portable device of claim 5, wherein, if an input for displaying the messenger chat window is received while displaying the first chat message and the second chat message in the pop-up window, the at least one processor is further configured to:
control the display to:
move the second chat message to be displayed within the messenger chat window, and
display the first chat message and the second chat message in the message chat window.

8. The portable device of claim 5, wherein, if an input for displaying a third chat message in response to a fourth chat message is received while displaying the first chat message and the second chat message in the pop-up window, the at least one processor is further configured to:
display, in the pop-up window the third chat message and the fourth chat message.

9. The portable device of claim 1,
wherein the at least one processor is further configured to determine a position of the second chat message among a plurality of chat messages in the messenger chat window based on the index information associated with the second chat message received from the second terminal, and
wherein the determination of whether the second chat message is currently displayed in the messenger chat window is based on the determined position of the second chat message among the plurality of chat messages.

10. The portable device of claim 1, wherein the at least one processor is further configured to:
receive an input associated with a selection of a fifth chat message currently displayed in the messenger chat window, the fifth chat message being received from the second terminal,
receive an input generating a sixth chat message, the sixth chat message being in response to the fifth chat message,
display the sixth chat message in a position near the fifth chat message in the messenger chat window, and
control the communication device to transmit, to the second terminal, information associated with the sixth chat message, the information associated with the sixth chat message including the fifth chat message, index information associated with the fifth chat message, the sixth chat message, and a phone number of the second terminal.

11. The portable terminal of claim 1, wherein, if the input for displaying the first chat message is received in response to the notification that the first chat message has been received, the at least one processor is further configured to:
control the display to:
move the second chat message to be displayed in the messenger chat window such that the first chat message and the second chat message are currently displayed in the message chat window.

12. An apparatus for controlling a messenger in a first terminal, the apparatus comprising:
a display configured to display, at the first terminal, a deleted specific chat phrase among a plurality of chat phrases in a messenger chat window, and an answer phrase to the deleted specific chat phrase; and
a processor configured to:
transmit, to a second terminal, an acknowledgement signal including a specific value indicating deletion of the specific chat phrase,
receive a related image of the deleted specific chat phrase from the second terminal,
detect the deleted specific chat phrase from received messenger information including the answer phrase, and
display the detected specific chat phrase and the answer phrase in the messenger chat window, if the specific chat phrase associated with the answer phrase among the plurality of chat phrases in the messenger chat window is deleted when the answer phrase to the specific chat phrase in the messenger chat window is received.

13. The apparatus of claim 12, wherein the processor is further configured to:
display as a pop-up window an image including the deleted specific chat phrase, the answer phrase, and preceding and subsequent phrases of the deleted specific chat phrase.

14. The apparatus of claim 12, wherein the processor is further configured to display the detected specific chat phrase and the answer phrase in a last position of the messenger chat window.

15. The apparatus of claim 12, wherein, when displaying the detected specific chat phrase and the answer phrase in the messenger chat window, the processor is further configured to display the detected specific chat phrase to be distinguishable from other chat phrases so as to indicate that the detected specific chat phrase is a deleted phrase.

16. The apparatus of claim 12, wherein the messenger information includes the specific chat phrase, index information of the specific chat phrase, and the answer phrase.

17. The apparatus of claim 12, wherein the processor is further configured to:
if an answer phrase to a specific chat phrase among a plurality of chat phrases in the messenger chat window is entered, display the entered answer phrase in a position near the specific chat phrase;
transmit, to the second terminal, messenger information including the specific chat phrase, index information of the specific chat phrase, the answer phrase to the specific chat phrase, and a phone number of the second terminal; and upon receiving from the second terminal an acknowledgement signal including a specific value indicating the deletion of the specific chat phrase, transmit to the second terminal an image obtained by capturing the specific chat phrase, the answer phrase to the specific chat phrase, and preceding and subsequent phrases of the specific chat phrase.

18. A method for controlling a messenger chat application in a first portable terminal, the method comprising:
displaying a messenger chat window of the messenger chat application on a display of the first portable terminal after receiving an indication at the first portable device to execute the messenger chat application;
receiving, from a second terminal, a first chat message corresponding to a second chat message previously transmitted from the first portable terminal to the second portable terminal using the messenger chat application, the first chat message including index information associated with the second chat message;
determining whether the second chat message is currently displayed in the messenger chat window based on the index information associated with the second chat message received from the second terminal;
if the second chat message is currently displayed in the message chat window, displaying the first chat message directly adjacent to the second chat message in the message chat window;
if the second chat message is not currently displayed in the message chat window, displaying a notification that the first chat message has been received; and
if an input for displaying the first chat message is received in response to the notification that the first chat message has been received, retrieving the second chat message associated with the first chat message and displaying the first chat message and the second chat message within the messenger chat window after the input for displaying the first chat message is received.

19. The method of claim 18, wherein the index information associated with the second chat message includes at least one of:
information associated with a time at which the second terminal received the second chat message,
information associated with a time at which the second terminal transmitted the first chat message, and
a specific value based on an order in which the first chat message is transmitted by the second terminal and the second chat message is received at the second terminal.

20. The method of claim 18, further comprising:
displaying a notification based on an aggregate number of total chat messages received from the second terminal in the messenger chat window,
wherein the aggregate number of total chat messages is based on a number of chat messages received from the second terminal in response to chat messages that are not currently displayed in the messenger chat window.

21. The method of claim 18, further comprising:
decreasing a number of chat messages displayed in the messenger chat window based on a number of inputs received for displaying chat messages in response to a notification that a chat message has been received from the second terminal.

22. The method of claim 18, further comprising:
after the input for displaying the first chat message is received in response to the notification that the first chat message has been received, displaying a pop-up window over the messenger chat window if the second chat message is not currently displayed in the message chat window, wherein the pop-up window includes the first chat message and the second chat message.

23. The method of claim 22 wherein, if an input for displaying the messenger chat window is received while displaying the first chat message and the second chat message in the pop-up window, the method further comprising:

moving the second chat message to be displayed in the messenger chat window, and displaying the first chat message and the second chat message in the message chat window.

24. The method of claim 22 wherein, if an input for displaying a third chat message in response to a fourth chat message is received while displaying the first chat message and the second chat message in the pop-up window, the method further comprising:

displaying, in the pop-up window, the third chat message and the fourth chat message.

25. The method of claim 18, further comprising:

after the input for displaying the first chat message is received in response to the notification that the first chat message has been received, generating an image including the first chat message, the second chat message, and at least one chat message positioned above the second chat message in the message chat window or at least one chat message positioned below the second chat message in the message chat window, wherein the pop-up window includes the generated image.

26. The method of claim 18, further comprising:

determining a position of the second chat message among a plurality of chat messages in the messenger chat window based on the index information associated with the second chat message received from the second terminal, wherein the determination of whether the second chat message is currently displayed in the messenger chat window is based on the determined position of the second chat message among the plurality of chat messages.

27. The method of claim 18, further comprising:

receiving an input associated with a selection of a fifth chat message currently displayed in the messenger chat window, the fifth chat message being received from the second terminal;

receiving an input generating a sixth chat message, the sixth chat message being in response to the fifth chat message;

displaying the sixth chat message in a position near the fifth chat message in the messenger chat window; and transmitting, to the second terminal, information associated with the sixth chat message, the information associated with the sixth chat message including the fifth chat message, index information associated with the fifth chat message, the sixth chat message, and a phone number of the second terminal.

28. The method of claim 18, wherein, if the input for displaying the first chat message is received in response to the notification that the first chat message has been received, the method further comprising:

moving the second chat message to be displayed in the messenger chat window such that the first chat message and the second chat message are currently displayed in the message chat window.

29. A method for controlling a messenger in a first terminal, the method comprising:

if a specific chat phrase associated with an answer phrase among a plurality of chat phrases in a messenger chat window is deleted when the answer phrase to the specific chat phrase in the messenger chat window is received, transmitting, to a second terminal, an acknowledgement signal including a specific value indicating deletion of the specific chat phrase;

receiving a related image of the deleted specific chat phrase from the second terminal;

detecting the deleted specific chat phrase from received messenger information including the answer phrase; and displaying the detected specific chat phrase and the answer phrase in the messenger chat window.

30. The method of claim 29, further comprising:

displaying as a pop-up window an image including the deleted specific chat phrase, the answer phrase, and preceding and subsequent phrases of the deleted specific chat phrase.

31. The method of claim 29, wherein the displaying comprises displaying the detected specific chat phrase and the answer phrase in a last position of the messenger chat window.

32. The method of claim 29, further comprising, when displaying the detected specific chat phrase and the answer phrase in the messenger chat window, displaying the detected specific chat phrase to be distinguishable from other chat phrases so as to indicate that the detected specific chat phrase is a deleted phrase.

33. The method of claim 29, wherein the messenger information includes the specific chat phrase, index information of the specific chat phrase, and the answer phrase.

34. The method of claim 29, further comprising:

if an answer phrase to a specific chat phrase among a plurality of chat phrases in the messenger chat window is entered, displaying the entered answer phrase in a position near the specific chat phrase;

transmitting, to the second terminal, messenger information including the specific chat phrase, index information of the specific chat phrase, the answer phrase to the specific chat phrase, and a phone number of the second terminal; and upon receiving from the second terminal an acknowledgement signal including a specific value indicating the deletion of the specific chat phrase, transmitting to the second terminal an image obtained by capturing the specific chat phrase, the answer phrase to the specific chat phrase, and preceding and subsequent phrases of the specific chat phrase.

* * * * *